US 11,193,374 B2

(12) United States Patent
Liu et al.

(10) Patent No.: US 11,193,374 B2
(45) Date of Patent: Dec. 7, 2021

(54) METHOD FOR INSPECTING SERVICE PERFORMANCE OF TUNNEL LINING BASED ON DEFECT CHARACTERISTICS THEREOF

(71) Applicants: TONGJI UNIVERSITY, Shanghai (CN); Shanghai Tongyan Civil Engineering Technology Corp.,Ltd., Shanghai (CN)

(72) Inventors: Xuezeng Liu, Shanghai (CN); Yunlong Sang, Shanghai (CN); Zhou Sun, Shanghai (CN)

(73) Assignees: TONGJI UNIVERSITY, Shanghai (CN); Shanghai Tongyan Civil Engineering Technology Corp, Shanghai (CN)

( * ) Notice: Subject to any disclaimer, the term of this patent is extended or adjusted under 35 U.S.C. 154(b) by 154 days.

(21) Appl. No.: 16/798,340

(22) Filed: Feb. 22, 2020

(65) Prior Publication Data
US 2021/0017861 A1  Jan. 21, 2021

(30) Foreign Application Priority Data
Jul. 19, 2019 (CN) .......................... 201910655422.5

(51) Int. Cl.
*E21F 17/18* (2006.01)
*G01B 5/02* (2006.01)
(Continued)

(52) U.S. Cl.
CPC ............... *E21F 17/18* (2013.01); *G01B 5/02* (2013.01); *G01B 11/02* (2013.01); *G01L 1/22* (2013.01);
(Continued)

(58) Field of Classification Search
None
See application file for complete search history.

(56) References Cited

U.S. PATENT DOCUMENTS

| 4,432,667 A * | 2/1984 | Richardson ............... E21B 7/20 405/143 |
| 10,116,871 B2 * | 10/2018 | Akashi .................. G06T 7/0008 |
| 2020/0142052 A1 * | 5/2020 | Liu ...................... G01M 5/0075 |

FOREIGN PATENT DOCUMENTS

| CN | 101131343 A | * | 2/2008 |
| CN | 102507348 B | * | 8/2013 |

(Continued)

OTHER PUBLICATIONS

Deev, P.V., Sammal', A.S. & Baryshnikov, V.D. Estimating remaining life of underground tunnel concrete lining by convergence measurements. J Min Sci 48, 440-444 (2012). https://doi.org/10.1134/S1062739148030069 (Year: 2012).*

*Primary Examiner* — Lina M Cordero

(57) ABSTRACT

The invention discloses a method for detecting service performance of a tunnel lining based on defect characteristics of the tunnel lining. A tunnel, an external load and stratum conditions are simulated by establishing a model using a model test method. A structural stress failure test for the model is carried out, and test results of the defect characteristics of a simulation lining of the model are recorded. A corresponding relationship between the defect characteristics of the simulation lining and the remaining bearing capacity interval is established according to the recorded test results. Detection results of defect characteristics of the tunnel lining are recorded using an in-situ detection method, and a remaining bearing capacity interval of the tunnel lining is determined based on the detection results according to the corresponding relationship between (Continued)

the defect characteristics of the simulation lining and the remaining bearing capacity interval of the model.

8 Claims, 4 Drawing Sheets

(51) Int. Cl.
    *G01B 11/02*     (2006.01)
    *G01L 1/22*     (2006.01)
    *G01N 19/08*     (2006.01)
    *G01N 21/954*     (2006.01)
    *G01V 9/00*     (2006.01)

(52) U.S. Cl.
    CPC ........... *G01N 19/08* (2013.01); *G01N 21/954* (2013.01); *G01V 9/00* (2013.01)

(56) References Cited

FOREIGN PATENT DOCUMENTS

| | | | |
|---|---|---|---|
| CN | 104502137 A | * | 4/2015 |
| CN | 106919784 A | | 7/2017 |
| CN | 107145997 A | | 9/2017 |
| CN | 108827669 A | * | 11/2018 |
| CN | 109708702 A | | 5/2019 |
| CN | 110132718 A | * | 8/2019 |
| KR | 100729994 B1 | * | 6/2007 |

\* cited by examiner

METHOD FOR INSPECTING SERVICE PERFORMANCE OF TUNNEL LINING BASED ON DEFECT CHARACTERISTICS THEREOF

CROSS-REFERENCE TO RELATED APPLICATIONS

This application claims the benefit of priority from Chinese Patent Application No. 201910655422.5, filed on Jul. 19, 2019. The content of the aforementioned application, including any intervening amendments thereto, is incorporated herein by reference in its entirety.

TECHNICAL FIELD

This application relates to service performance evaluations for highway tunnels, and particularly to a method for detecting service performance of a tunnel lining based on defect characteristics thereof.

BACKGROUND OF THE INVENTION

In China, large-scale constructions of tunnels cause the increasing number of operating tunnels year by year. At the same time, due to changes in an external environment of a tunnel structure and weakening of the structure materials, defects caused by the tunnel lining become a particularly prominent problem. Meanwhile, defect characteristics of the tunnel lining are the most intuitive index to reflect the structural safety of the tunnel. In order to ensure the safety of the tunnel structure and reasonably evaluate service performance of the tunnel lining, it is necessary to propose a method for detecting the service performance of the tunnel lining based on defects of the tunnel lining.

Chinese Patent Publication No. 106919784 A discloses a method for evaluating service performance of a shield tunnel based on varing weights, which obtains required monitoring and detecting data for the evaluation according to the service performance evaluation index system of the shield tunnel, evaluates a structural unit based on a fuzzy comprehensive evaluation method, and comprehensively determines a service performance level of the overall tunnel based on the evaluation level of the structural unit.

"*Technical Standards for Maintenance of Tunnel Structures in Urban Rail Transit*" CJJ/T289-2018 establishes a comprehensive relationship between the service performance of a shield (TBM) tunnel and the defect index using an expert scoring method.

The above-mentioned publications have studied methods for evaluating the service performance of the tunnel. However, those methods only consider a fuzzy relationship between the tunnel defects and the tunnel, and corresponding quantitative relationship therebetween has not been established. In addition, these methods have not established a corresponding relationship between defect characteristics of the tunnel lining and a remaining bearing capacity and health degree of the tunnel.

SUMMARY OF THE INVENTION

An object of the invention is to provide a method for service performance of a tunnel lining based on defect characteristics of the tunnel lining to overcome above-mentioned shortcomings.

The technical solutions of the invention are specifically described as follows.

Provided is a method for detecting service performance of a tunnel lining based on defect characteristics of the tunnel lining. The service performance of the tunnel lining is specifically quantified as a remaining bearing capacity interval of the tunnel lining. The method comprises:

(1) simulating a tunnel, an external load and stratum conditions by establishing a tunnel using a model test method, carrying out a structural stress failure test for the model, and recording test results of the defect characteristics of a simulation lining of the model;

(2) establishing a corresponding relationship between the defect characteristics of the simulation lining and a remaining bearing capacity interval of the model according to the test results of the defect characteristics of the simulation lining recorded in step (1);

(3) recording detection results of defect characteristics of the tunnel lining using an in-situ detection method;

(4) determining a remaining bearing capacity interval of the tunnel lining in step (3) based on the detection results of the defect characteristics of the tunnel lining in step (3) according to the corresponding relationship between the defect characteristics of the simulation lining and the remaining bearing capacity interval of the model in step (2).

Step (1) comprises:

(101) determining a size, structural mechanical parameters, stratum mechanical parameters of the tunnel lining, and the external load of the tunnel, wherein the structural mechanical parameters comprise parameters of cracks and reinforcing bars;

detecting and recording the defect characteristics of the tunnel lining, and carrying out a similar model test on defective and intact tunnel linings;

(102) determining a geometric similarity ratio $C_L$, a stress similarity ratio $C_\sigma$ and an elastic modulus similarity ratio $C_E$ of the model to the tunnel, and determining a displacement similarity ratio $C_d$, a strain similarity ratio $C_\varepsilon$, a load similarity ratio $C_P$, a bending moment similarity ratio $C_M$ and a stratum resistance similarity ratio $C_k$ of the model to the tunnel according to a similarity theory;

(103) selecting sand, cement, gypsum and reinforcing bars for a proportioning cube test to prepare a tunnel simulation material that satisfies the stress similarity ratio $C_\sigma$ and the elastic modulus similarity ratio $C_E$ according to the geometric similarity ratio $C_L$, the stress similarity ratio $C_\sigma$ and the elastic modulus similarity ratio $C_E$ of the model to the tunnel in step (102), and pouring the tunnel simulation material into the model and curing the model through vibrations;

(104) manufacturing a test device according to the geometric similarity ratio $C_L$ and the load similarity ratio $C_P$ of the model to the tunnel in step (102), wherein the test device comprises a load control system and a data acquisition system; the load control system comprises a reaction frame, a jack, a loading plate, and a spring for simulating stratum resistance; the number and a stiffness of the spring meet requirements of the stratum resistance;

the load control system controls and simulates a top loose load, a bias load and a plastic ground load on both sides of tunnel side walls;

the data acquisition system comprises a pressure sensor, a data acquisition device, a displacement indicator and a strain gauge; the number of the pressure sensor corresponds to the number of the spring and the number of curved plates, respectively; the displacement indicator is arranged at a middle of each of the curved plates which are arranged at an outer side of the model; the pressure sensor, the displacement indicator and the strain gauge are connected to the data acquisition device, respectively; and (105) simulating the top loose load, the bias load and the plastic ground load on both sides of the tunnel side walls by the load control system in a static classification mode; wherein each level of load is stabilized for 60 minutes after being applied, and then a next level of load is applied until the simulation lining is damaged.

Defects of the tunnel lining comprise back cavities, insufficient thickness, weak strength, cracks and insufficient reinforcing bars; the back cavities are simulated by arranging no spring and load; the cracks are prefabricated according to the parameters of cracks obtained in step (101); a portion with the insufficient thickness is simulated according to the structural mechanics parameters; a portion with insufficient reinforcement bars is simulated according to the parameters of the reinforcing bars obtained in step (101).

The tunnel lining is damaged when a main tensile reinforcing bar is broken, concrete in a compression zone is crushed, deformation increases continuously under the same load, or a maximum vertical width of the cracks reaches 1.5 mm. If the tunnel lining is damaged after a continuous load ends, a load at that time should be a measured failure load; if the tunnel lining is damaged during a loading process, a previous load is taken as the measured failure load; if the tunnel lining is damaged during the continuous load, an average value of a current load and a previous load is taken as the measured failure load.

The defect characteristics of the tunnel lining comprise vault subsidence, side wall convergence, crack density and crack depth.

The corresponding relationship between the defect characteristics of the tunnel lining and the remaining bearing capacity interval comprises a corresponding relationship between the vault subsidence and the remaining bearing capacity interval, a corresponding relationship between the side wall convergence and the remaining bearing capacity interval, a corresponding relationship between the crack density and the remaining bearing capacity interval and a corresponding relationship between the crack depth and the remaining bearing capacity interval, respectively.

Step (3) comprises:

(301) measuring the crack depth of the tunnel lining by a crack depth sounder;

(302) measuring a crack width of the tunnel lining by a vernier caliper, a crack width gauge or an image recognition method;

(303) measuring a crack length of the tunnel lining by a tape measure or an image recognition method;

(304) detecting a thickness, distribution of the reinforcing bars, and back cavity conditions of the tunnel lining by a geological radar, wherein the back cavity condition of the tunnel lining comprises a circumferential range and a longitudinal length of the back cavity;

(305) measuring the vault subsidence and the side wall convergence of the tunnel lining by a total station or a laser profiler.

Step (4) comprises:

(401) determining a corresponding relationship between the defect characteristics of the tunnel lining and the remaining bearing capacity interval according to model similarity ratios and the corresponding relationship between the defect characteristics of the tunnel lining and the remaining bearing capacity interval determined by the model;

(402) determining the remaining bearing capacity interval of the tunnel according to the most unfavorable principle when several defect characteristics exist based on the test results of the defect characteristics of the tunnel lining measured in steps (301)-(305) according to the corresponding relationship between the defect characteristics of the tunnel lining and the remaining bearing capacity interval obtained in step (401).

Comparing with the prior art, the invention has the following beneficial effects.

(1) The invention rapidly determines the remaining bearing capacity interval of the tunnel according to the defect characteristics of the tunnel lining which are detected in-site, improving work efficiency of the tunnel safety detection.

(2) The invention provides data support for a rapid safety evaluation of the tunnel, guiding the operation and curing of the tunnel.

(3) The invention establishes a model according to the geometric similarity ratio $C_L$, the stress similarity ratio $C_\sigma$ and the elastic modulus similarity ratio $C_E$ of the model to the tunnel, thus simulating several defect characteristics at the same time, which has high practicability.

Figure 1:
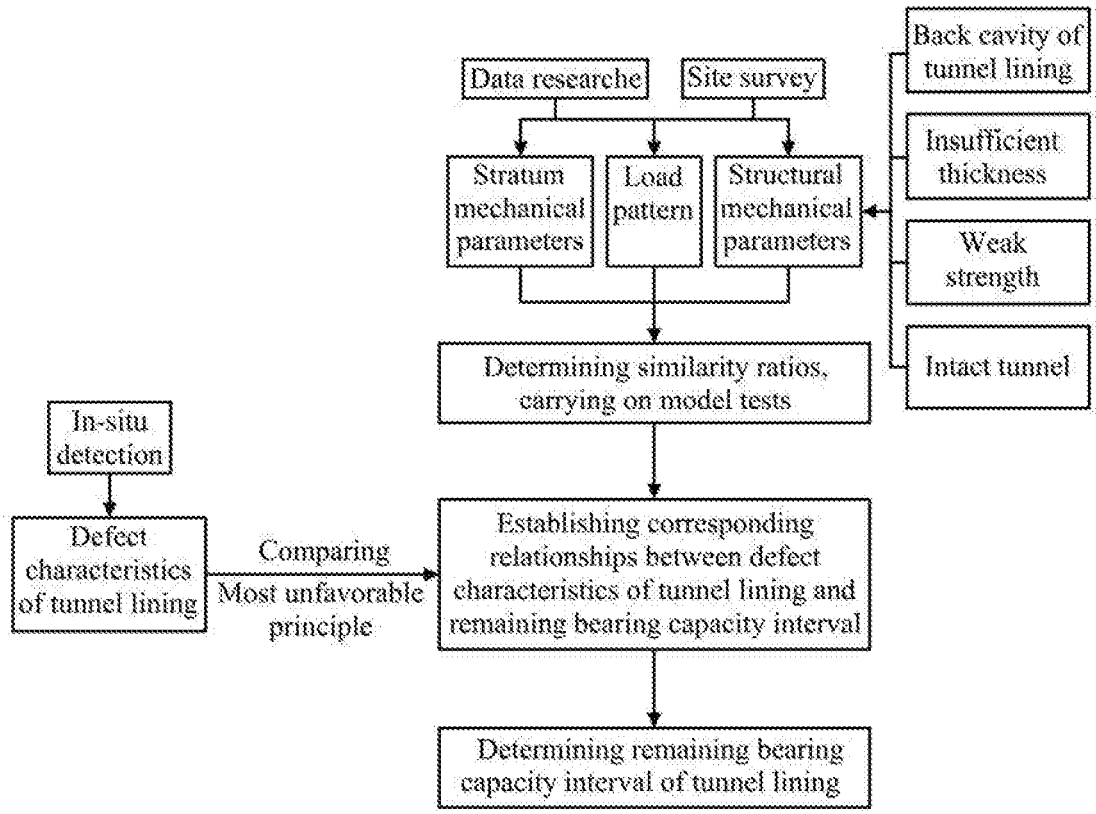
FIG. 1 is a flow chart of a method for detecting service performance of a tunnel lining based on defect characteristics of the tunnel lining according to the present invention.

In the drawings, 1—model of secondary tunnel lining, 2—reaction frame, 3—jack, 4—pressure sensor, 5—spring, 6—loading plate, 7—data acquisition device, 8—displacement indicator, W—cavity range, d—actual thickness, D—designed thickness.

DETAILED DESCRIPTION OF EMBODIMENTS

The invention will be described in detail with reference to the accompanying drawings and specific embodiments as follows. The embodiments are only intended to illustrate but not to limit the scope of the invention.

As shown in FIG. 1, provided is method for detecting service performance of a tunnel lining based on defect characteristics of the tunnel lining, including the following steps.

(1) A tunnel, an external load and stratum conditions are simulated by establishing a model using a model test method; a structural stress failure test for the model is carried out, and test results of the defect characteristics of a simulation lining of the model are recorded.

Taking a two-lane highway tunnel as an example, the tunnel has a cross section with a width of 1186 cm, a height of 962.8 cm and an axial length of 300 cm. The model is C30 reinforced concrete with a thickness of 50 cm. A main tensile reinforcing bar is HRB335, and a protective layer has a thickness of 5 cm and a reinforcement percentage of 0.62%. Considering the test site size and loading conditions, a geometric similarity ratio $C_L$ is set to 10, and the simulation lining has a thickness of 5 cm, a width of 118.6 cm, a height of 96.28 cm and an axial length of 30 cm. According to several comparing tests, the concrete material is simulated by M30 mixed mortar made by cement, yellow sand, lime plaster and water with a mass ratio of 187:1450:113:330. A cube test block of 7 cm×7 cm×7 cm is measured to have a compressive strength of 31 Mpa by an uniaxial compression test, and a stress similarity ratio $C_\sigma$ is set to be approximately 10:1. A prism test block of 10 cm×10 cm×30 cm is measured to have an elastic modulus of 1.57 Gpa by an uniaxial compression test, and an elastic modulus similarity ratio $C_E$ is set to be approximately 20:1. As shown in Table 1, Similarity constants of respective physical quantities in the model can be obtained according to the similarity theory.

TABLE 1

Similarity constants of physical quantities in the test model

| Physical quantity | Unit | Similarity constant |
| --- | --- | --- |
| Length L | m | 10 |
| Displacement δ | m | 5 |
| Stress σ | N/m² | 10 |
| Elastic modulus E | N/m² | 20 |
| Surface force s | N/m² | 10 |
| Strain ε | "1" | 0.5 |
| Poisson's ratio μ | "1" | 1 |
| Physical force ρ | N/m³ | 1 |
| Force N | N | 1,000 |
| Bending moment M | N · m | 10,000 |
| Stratum resistance coefficient k | N/m³ | 2 |

Step (1) includes the following steps.

(101) a size, structural mechanical parameters, stratum mechanical parameters of the tunnel lining, and the external load of the tunnel are determined, where the structural mechanical parameters include parameters of cracks and reinforcing bars; the defect characteristics of the tunnel lining are detected and recorded; a similar model test on defective and intact tunnel linings is carried out according to the test results.

Figure 3:
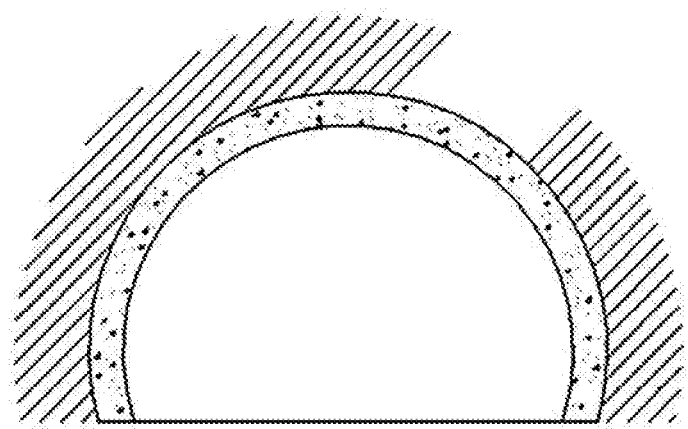
FIG. 3 schematically shows a back cavity of the tunnel lining according to the present invention.
Figure 4:
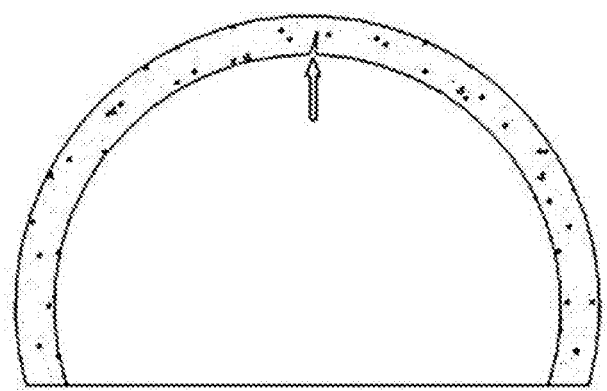
FIG. 4 schematically shows a crack of the tunnel lining according to the present invention, in which the crack does not penetrate through the tunnel lining.
Figure 5:
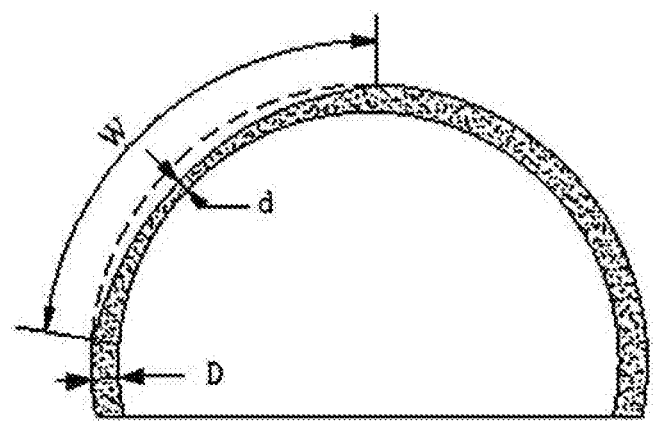
FIG. 5 schematically shows the tunnel lining with an insufficient thickness according to the present invention.

Defects of the tunnel lining comprise back cavities, insufficient thickness, weak strength, cracks and insufficient reinforcing bars; the back cavities are simulated by arranging no spring and load as shown in FIG. 3; the cracks are prefabricated according to the parameters of cracks obtained in step (101); a portion with the insufficient thickness is simulated according to the structural mechanics parameters as shown in FIG. 4; a portion with insufficient reinforcement bars is simulated according to the parameters of the reinforcing bars obtained in step (101) as shown in FIG. 5.

(102) a geometric similarity ratio $C_L$, a stress similarity ratio $C_\sigma$ and an elastic modulus similarity ratio $C_E$ of the model to the tunnel are determined; a displacement similarity ratio $C_d$, a strain similarity ratio $C_\varepsilon$, a load similarity ratio $C_P$, a bending moment similarity ratio $C_M$ and a stratum resistance similarity ratio $C_k$ of the model to the tunnel according to a similarity theory are determined.

(103) sand, cement, gypsum and reinforcing bars are selected for a proportioning cube test to prepare a tunnel simulation material that satisfies the stress similarity ratio $C_\sigma$ and the elastic modulus similarity ratio $C_E$ according to the geometric similarity ratio $C_L$, the stress similarity ratio $C_\sigma$ and the elastic modulus similarity ratio $C_E$ of the model to the tunnel in step (102), and the tunnel simulation material is poured into the model and the model is cured through vibrations.

Figure 2:
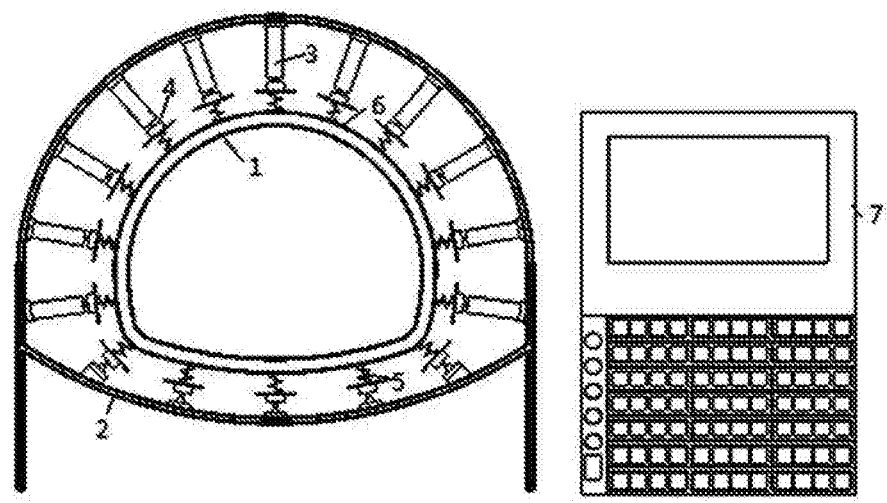
FIG. 2 schematically shows a model of the tunnel according to the present invention.

(104) a test device is manufactured according to the geometric similarity ratio $C_L$ and the load similarity ratio $C_P$ of the model to the tunnel in step (102), where the test device includes a load control system and a data acquisition system. As shown in FIG. 2, the load control system is connected at an outer side of the model 1 of the secondary tunnel lining, and the load control system includes a reaction frame 2, a jack 3, a loading plate 6, and a spring 5 for simulating stratum resistance; the number and a stiffness of the spring 5 meet requirements of the stratum resistance; the load control system controls and simulates a top loose load, a bias load and a plastic ground load on both sides of tunnel side walls.

To simulate Grade VI surrounding rock having an elasticity resisting coefficient of 3.16 MPa/m, a stiffness coefficient of the spring 5 is calculated to be 100 kN/m according to Equation 1:

$$K = ksC_k = ks\frac{C_E}{C_L} = 100 \text{ kN/m}; \quad (1)$$

where K is the stiffness coefficient of the spring; k is a stratum resistance coefficient; s is an area of the loading plate; $C_k$ is a stratum resistance coefficient similarity ratio; $C_E$ is the elastic modulus similarity ratio; and $C_L$ is the geometric similarity ratio.

The stiffness coefficient of the spring for simulating elasticity resisting coefficient of Grade IV-V surrounding rocks is calculated according to Equation 1, respectively.

Figure 6:
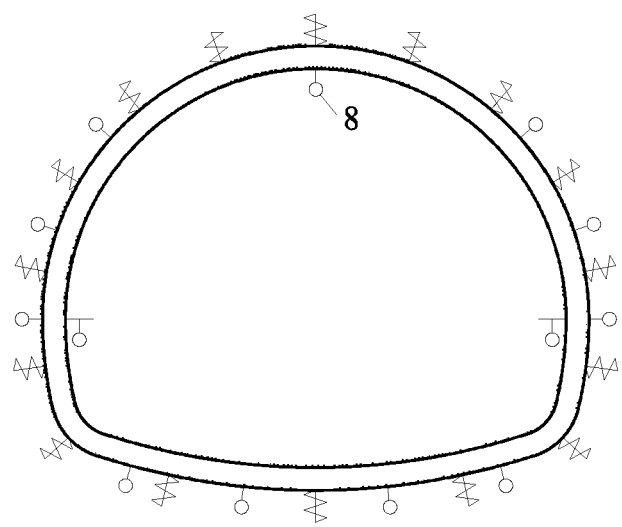
FIG. 6 schematically shows a measuring point arrangement of a data acquisition system according to the present invention.

As shown in FIGS. 2 and 6, the data acquisition system includes a pressure sensor 4, a data acquisition device 7 and a displacement indicator 8. FIG. 6 schematically shows the measuring point arrangement of the data acquisition system. The displacement indicator 8 is arranged in a middle of each of the curved plates which are arranged at an outer surface of the model to measure a radial displacement all around the model. The displacement indicator 8 is respectively installed at left and right sides of an arch line to measure the subsidence of the arch line. The pressure sensor 4 and the displacement indicator 8 are connected to a computer via the data acquisition device 7 to achieve automatic acquisition of displacement, load and strain data.

(105) the load control system simulates the top loose load, the bias load and the plastic ground load on both sides of the tunnel side walls in a static classification mode; each level of load is stabilized for 60 minutes after being applied, and then a next level of load is applied until the simulation lining is damaged.

The tunnel lining is damaged when a main tensile reinforcing bar is broken, concrete in a compression zone is crushed, deformation increases continuously under the same load, or a maximum vertical width of the cracks reaches 1.5 mm. If the tunnel lining is damaged after a continuous load ends, a load at that time should be a measured failure load; if the tunnel lining is damaged during a loading process, a previous load is taken as the measured failure load; if the tunnel lining is damaged during the continuous load, an average value of a current load and a previous load is taken as the measured failure load.

(2) a corresponding relationship between the defect characteristics of the simulation lining and the remaining bearing capacity interval is established according to the test results of the defect characteristics of the simulation lining recorded in step (1). Step (2) is specifically described as follows.

Figure 7:
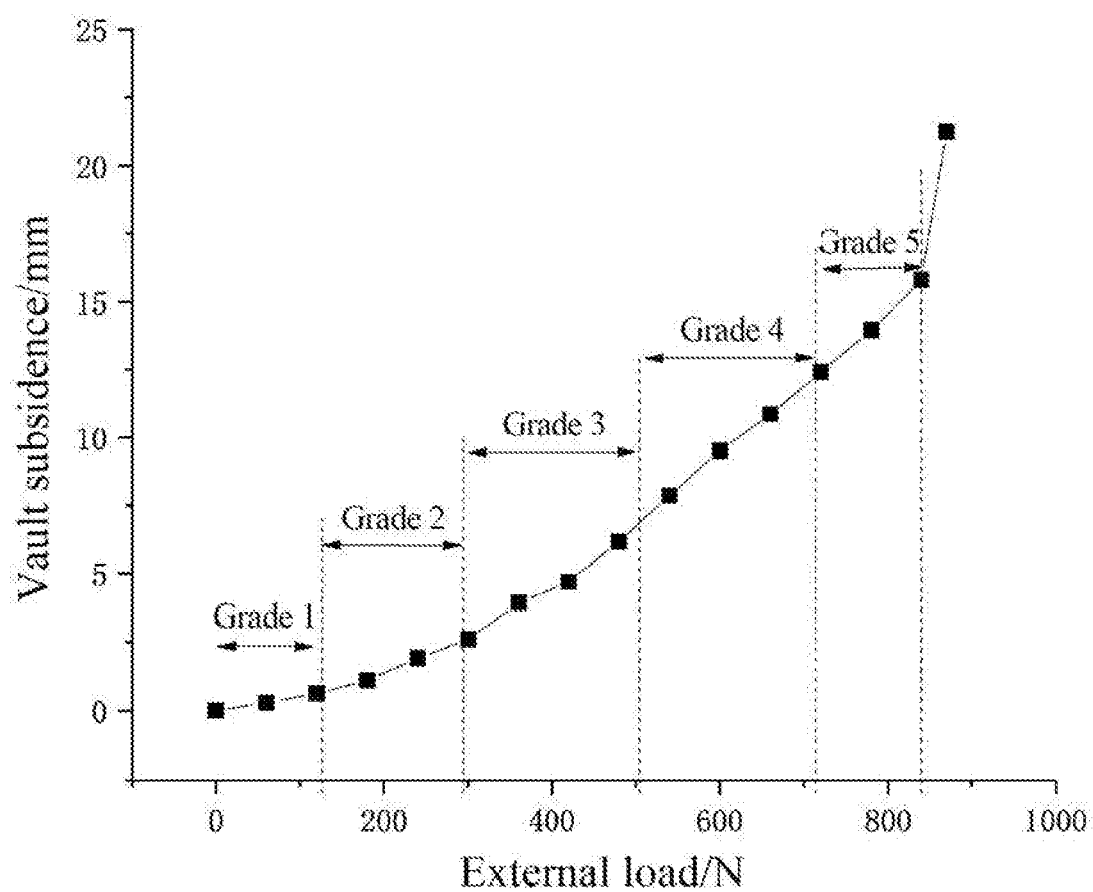
FIG. 7 is a curve showing the relationship between a vault subsidence and a structural bearing capability according to the present invention.
Figure 8:
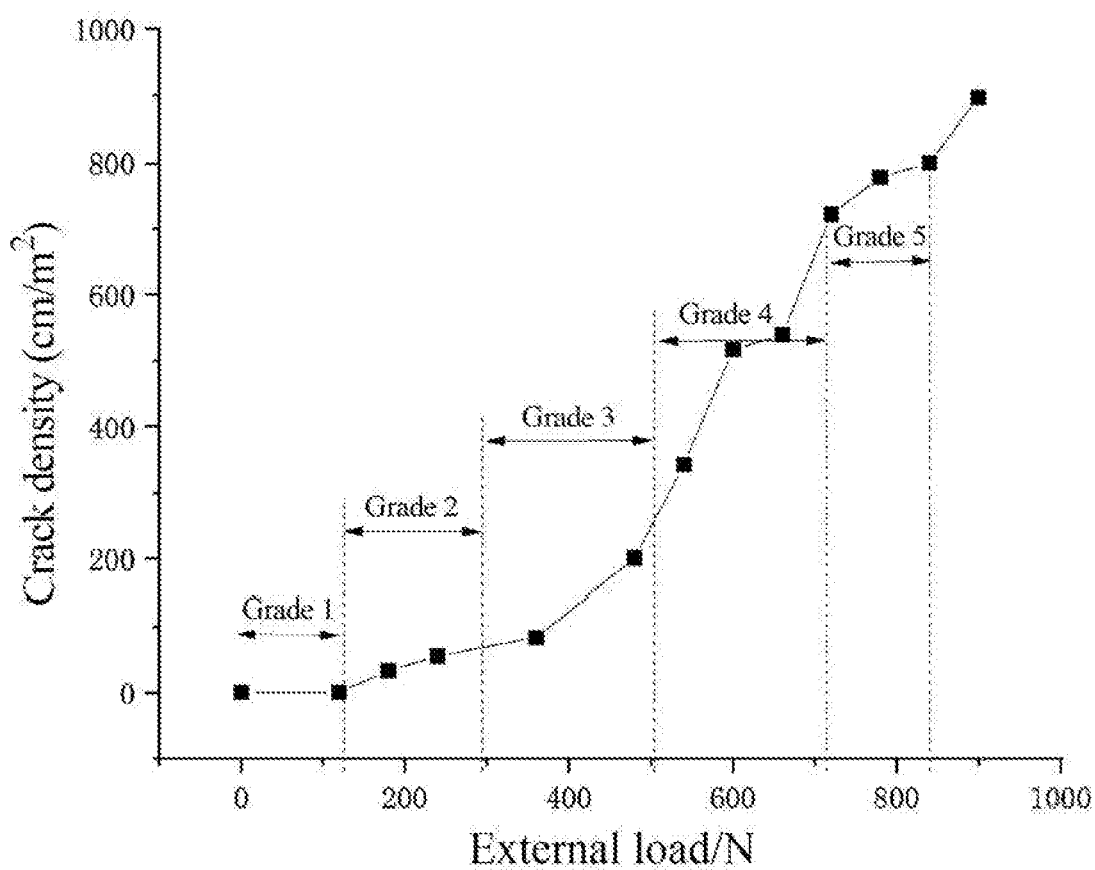
FIG. 8 is a curve showing the relationship between a crack density and the structural bearing capability according to the present invention.

The test results of the defect characteristics of the simulation lining are analyzed to obtain a deformation rule of the defect characteristics of the tunnel lining of intact and defective tunnel linings by increasing the external load. A curve showing the relationship between the vault subsidence and the structural bearing capacity is established as shown in FIG. 7; a curve showing the relationship between the side wall convergence and the structural bearing capacity is established; a curve showing the relationship between the crack density and the structural bearing capacity is established as shown in FIG. 8; and a curve showing the relationship between the crack depth and the structural bearing capacity is established. According to these curves, a corresponding relationship between the vault subsidence and the structural bearing capacity, a corresponding relationship between the side wall convergence and the structural bearing capacity, a corresponding relationship between the crack density and the structural bearing capacity and a corresponding relationship between the crack depth and the structural bearing capacity are established.

The corresponding relationships between the defect characteristics of the tunnel lining and the remaining bearing capacity interval are shown in Table 2.

TABLE 2

Corresponding relationships between the defect characteristics of the tunnel lining and the remaining bearing capacity interval

| Remaining bearing capacity interval | Vault subsidence/ cm | Side wall convergence/ cm | Crack density cm/m² | Crack depth/ cm |
|---|---|---|---|---|
| 100%~85% | 0~0.06 | 0~0.04 | 0 | 0 |
| 85%~60% | 0.06~0.25 | 0.04~0.15 | 0~60 | 0~1 |
| 60%~35% | 0.25~0.7 | 0.15~0.5 | 60~310 | 1~2 |
| 35%~15% | 0.7~1.15 | 0.5~0.9 | 310~700 | 2~3.5 |
| 15%~0% | 1.15~1.5 | 0.9~1.3 | ≥700 | ≥3.5 |

(3) detection results of defect characteristics of the tunnel lining are recorded using an in-situ detection method. Step (3) is specifically described as follows.

(301) the crack depth of the tunnel lining is measured by a crack depth sounder.

(302) a crack width of the tunnel lining is measured by a vernier caliper, a crack width gauge or an image recognition method.

(303) a crack length of the tunnel lining is measured by a tape measure or an image recognition method.

(304) a thickness, distribution of the reinforcing bars, and back cavity conditions of the tunnel lining are detected by geological radar, where the back cavity condition of the tunnel lining includes a circumferential range and a longitudinal length of the back cavity.

(305) the vault subsidence and the side wall convergence of the tunnel lining are measured by a total station or a laser profiler.

Taking a cross section of Baiyangshan Tunnel in Zhejiang as an example, the detection results of the defect characteristics of the tunnel lining are shown in Table 3.

TABLE 3

Defect characteristics of a cross section of Baiyangshan Tunnel in Zhejiang

| | Defect characteristics | | | |
|---|---|---|---|---|
| | Vault subsidence/ cm | Side wall convergence/ cm | Crack density cm/m² | Crack depth/ cm |
| Detection value | 3 | 1.2 | 85 | 12 |

(4) a remaining bearing capacity interval of the tunnel lining in step (3) is determined based on the detection results of the defect characteristics of the tunnel lining in step (3) according to the corresponding relationship between the defect characteristics of the simulation lining and the remaining bearing capacity interval of the model in step (2). Step (4) is specifically described as follows.

(401) a corresponding relationship between the defect characteristics of the tunnel lining and the remaining bearing capacity interval is determined according to model similarity ratios and the corresponding relationship between the defect characteristics of the tunnel lining and the remaining bearing capacity interval determined by the model.

The deformation $\delta_p$, load $P_p$, and crack density $\rho_m$ of the tunnel lining are back calculated according to deformation $\delta_m$, load $P_m$, and crack density $\rho_m$ of the model measured in the test and Equations (2), (3) and (4), respectively:

$$\delta_p = \delta_m * C_\delta \qquad (2)$$

$$P_p = P_m * C_P \qquad (3)$$

$$\rho_p = \rho_m * C_\rho \qquad (4)$$

where $C_\delta$ is the deformation similarity ratio, $C_P$ is the load similarity ratio, $C_\rho$ is the crack density similarity ratio.

As shown in Table 4, the corresponding relationship between the defect characteristics of the tunnel lining and the remaining bearing capacity interval is determined according to the similarity ratios of the tunnel to the model.

TABLE 4

Corresponding relationship between the defect characteristics of the tunnel lining and the remaining bearing capacity interval

| Remaining bearing capacity interval | Vault subsidence/ cm | Side wall convergence/ cm | Crack density cm/m² | Crack depth/ cm |
|---|---|---|---|---|
| 100%~85% | 0~0.3 | 0~0.2 | 0 | 0 |
| 85%~60% | 0.3~1.25 | 0.2~0.75 | 0~12 | 0~5 |
| 60%~35% | 1.25~3.5 | 0.75~2.5 | 12~62 | 5~10 |
| 35%~15% | 3.5~6 | 2.5~4.5 | 62~140 | 10~17.5 |
| 15%~0% | 6~7.5 | 4.5~6.5 | ≥140 | ≥17.5 |

(402) the remaining bearing capacity interval of the tunnel is determined according to the most unfavorable principle when several defect characteristics exist based on the test results of the defect characteristics of the tunnel lining measured in steps (301)-(305) according to the corresponding relationship between the defect characteristics of the tunnel lining and the remaining bearing capacity interval obtained in step (401).

According to the defect characteristics of a cross section of Baiyangshan Tunnel in Zhejiang in Table 3 and the corresponding relationship between the defect characteristics of the tunnel lining and the remaining bearing capacity interval in Table 4, the remaining bearing capacity interval corresponding to the vault subsidence is determined as 60%~35%; the remaining bearing capacity interval corresponding to the side wall convergence is determined as 60%~35%; the remaining bearing capacity interval corresponding to the crack density is determined as 35%~15%, the remaining bearing capacity interval corresponding to the crack depth is determined as 35%~15%. Based on these defect characteristics, the remaining bearing capacity interval of the lining structure of Baiyangshan Tunnel in Zhejiang is determined as 35~15% according to the most unfavorable principle.

What is claimed is:

1. A method for detecting service performance of a tunnel lining based on defect characteristics of the tunnel lining, comprising:
   (1) simulating a tunnel, an external load and stratum conditions by establishing a model using a model test method, carrying out a structural stress failure test on the model, and recording test results of the defect characteristics of a simulation lining of the model;
   (2) establishing a corresponding relationship between the defect characteristics of the simulation lining and a remaining bearing capacity interval of the model according to the test results of the defect characteristics of the simulation lining recorded in step (1);
   (3) recording detection results of the defect characteristics of the tunnel lining using an in-situ detection method;
   (4) determining a remaining bearing capacity interval of the tunnel lining in step (3) based on the detection results of the defect characteristics of the tunnel lining in step (3) according to the corresponding relationship between the defect characteristics of the simulation lining and the remaining bearing capacity interval of the model in step (2).

2. The method of claim 1, wherein step (1) comprises:
   (101) determining a size, structural mechanical parameters, stratum mechanical parameters of the tunnel lining, and the external load of the tunnel, wherein the structural mechanical parameters comprise parameters of cracks and reinforcing bars; detecting and recording the defect characteristics of the tunnel lining, and carrying out a similar model test on defective and intact tunnel linings;
   (102) determining a geometric similarity ratio $C_L$, a stress similarity ratio $C_\sigma$ and an elastic modulus similarity ratio $C_E$ of the model to the tunnel, and determining a displacement similarity ratio $C_d$, a strain similarity ratio $C_\varepsilon$, a load similarity ratio $C_p$, a bending moment similarity ratio $C_M$ and a stratum resistance similarity ratio $C_k$ of the model to the tunnel according to a similarity theory;
   (103) selecting sand, cement, gypsum and the reinforcing bars for a proportioning cube test to prepare a tunnel simulation material that satisfies the stress similarity ratio $C_\sigma$ and the elastic modulus similarity ratio $C_E$ according to the geometric similarity ratio $C_L$, the stress similarity ratio $C_\sigma$ and the elastic modulus similarity ratio $C_E$ of the model to the tunnel in step (102), and pouring the tunnel simulation material into the model and curing the model through vibrations;
   (104) manufacturing a test device according to the geometric similarity ratio $C_L$ and the load similarity ratio $C_p$ of the model to the tunnel in step (102); wherein the test device comprises a load control system and a data acquisition system; the load control system comprises a reaction frame, a jack, a loading plate, and a spring for simulating stratum resistance; a number and a stiffness of the spring meet requirements of the stratum resistance;
   the load control system controls and simulates a top loose load, a bias load and a plastic ground load on both sides of tunnel side walls;
   the data acquisition system comprises a pressure sensor, a data acquisition device, a displacement indicator and a strain gauge; a number of the pressure sensor corresponds to the number of the spring and a number of curved plates, respectively; the displacement indicator is arranged in a middle of each of the curved plates which are arranged at an outer side of the model; the pressure sensor, the displacement indicator and the strain gauge are connected to the data acquisition device, respectively; and
   step (105) simulating the top loose load, the bias load and the plastic ground load on both sides of the tunnel side walls by the load control system in a static classification mode; wherein each level of load is stabilized for 60 minutes after being applied, and then a next level of load is applied until the simulation lining is damaged.

3. The method of claim 2, wherein defects of the tunnel lining comprise back cavities, insufficient thickness, weak strength, cracks and insufficient reinforcing bars; the back cavities are simulated by arranging no spring and load; the cracks are prefabricated according to the parameters of cracks obtained in step (101); a portion with the insufficient thickness is simulated according to the structural mechanics parameters; a portion with insufficient reinforcement bars is simulated according to the parameters of the reinforcing bars obtained in step (101).

4. The method of claim 3, wherein the tunnel lining is damaged when a main tensile reinforcing bar is broken, concrete in a compression zone is crushed, deformation increases continuously under the same load, or a maximum vertical width of the cracks reaches 1.5 mm.

5. The method of claim 2, wherein the defect characteristics of the tunnel lining comprise vault subsidence, side wall convergence, crack density and crack depth.

6. The method of claim 5, wherein the corresponding relationship between the defect characteristics of the tunnel lining and the remaining bearing capacity interval comprises a corresponding relationship between the vault subsidence and the remaining bearing capacity interval, a corresponding relationship between the side wall convergence and the remaining bearing capacity interval, a corresponding relationship between the crack density and the remaining bearing capacity interval and a corresponding relationship between the crack depth and the remaining bearing capacity interval, respectively.

7. The method of claim 5, wherein step (3) comprises:
   (301) measuring the crack depth of the tunnel lining by a crack depth sounder;
   (302) measuring a crack width of the tunnel lining by a vernier caliper, a crack width gauge or an image recognition method;
   (303) measuring a crack length of the tunnel lining by a tape measure or an image recognition method;
   (304) detecting a thickness, distribution of the reinforcing bars, and back cavity conditions of the tunnel lining by a geological radar, wherein the back cavity condition of the tunnel lining comprises a circumferential range and a longitudinal length of the back cavity; and (305) measuring the vault subsidence and the side wall convergence of the tunnel lining by a total station or a laser profiler.

8. The method of claim 7, wherein step (4) comprises:

(401) determining a corresponding relationship between the defect characteristics of the tunnel lining and the remaining bearing capacity interval according to model similarity ratios and the corresponding relationship between the defect characteristics of the tunnel lining and the remaining bearing capacity interval determined by the model; and (402) determining the remaining bearing capacity interval of the tunnel according to the most unfavorable principle when several defect characteristics exist based on the test results of the defect characteristics of the tunnel lining measured in steps (301)-(305) according to the corresponding relationship between the defect characteristics of the tunnel lining and the remaining bearing capacity interval obtained in step (401).

\* \* \* \* \*